Patented Jan. 15, 1946

2,392,833

UNITED STATES PATENT OFFICE 2,392,833

COMMINUTED SHORTENING

Edward K. Chapin, Chicago, Ill., assignor to Beatrice Creamery Company, Chicago, Ill., a corporation of Delaware No Drawing. Application March 3, 1943, Serial No. 477,860

15 Claims. (Cl. 99—123)

This invention relates to improvements in dry, comminuted or siftable shortenings and the process by which such shortenings are produced.

Comminuted shortenings, generally speaking, are composed of edible fats or oils in a finely divided, nonadherent state in which each particle is coated or surrounded with a residual solids product of milk or whey remaining after the removal of substantially all of the moisture. Such finely divided, dry, coated particles of fat result from the flash evaporation of colloidally dispersed or emulsified fats in a medium of skimmed milk or whey or similar medium. The edible fats or oils may be liquid materials, semi-solid materials or those which are solid at room temperature, either natural or chemically produced such as by hydrogenation. The oils may be cottonseed oil, corn oil, peanut oil, sunflower or other edible oils; the semi-solid fats may be lard, butter, margarine or the like; the solid fats may be animal fats or they may be the liquid oils previously mentioned which have been hydrogenated. Or they may be hydrogenated soybean oil, hydrogenated fish oil, sperm oil or the like; in addition, the fats may be composed of any combination of the oils, semi-solid or solid fats. These comminuted shortenings usually contain upward of 50% of these fatty materials.

In the processing of dough for baking purposes, such as in making bread, cake, doughnuts or the like, it is highly desirable to disseminate the shortening in an extremely uniform dispersion throughout the dough mass in order to be able to derive the complete usefulness of the shortening; obviously this is not an easy task when it is realized that shortening is kneaded into the dough when it is in an extremely viscous, tacky condition, and that the water which produces this tackiness acts to prevent the thorough dispersion of the oily fats. It is a known fact that the value of shortening is directly related to the thoroughness with which it can be incorporated into the dough batch; that the less thorough its incorporation, the greater the amount of shortening required to produce equivalent effects. It is obvious that a powdered or granular shortening is more easily incorporated into the mix than a liquid or plastic oil. Likewise as a convenience to housewives it is obvious that a powdered or granular material high in edible fat such as lard, vegetable oils, butter, etc., has many uses, and my product may therefore be used as a means for enhancing the richness and nutritional value of baked goods, cooked foods and the like, such as cakes, pancakes, gravies, etc. Other uses of my product have been indicated as, for example, in simulating the function of egg yolks in baking, or at least substantially reducing their requirement in a baking formula.

I am aware that in Chapin Patent No. 1,928,781 there is described a process in which greater ease of dispersion is claimed than when untreated fats alone are used. In this patent fats are emulsified into milk of normal moisture content and then dehydrated.

I am also aware that in Kraft Patent No. 2,035,899 there is described a process similar to Chapin, but in which whey solids are emulsified with fats and then dehydrated.

In both of these patents it is true that greater ease of dispersion of the shortening in dough masses is obtained as compared with the use of shortenings, that is, oils or fats, as they naturally exist. However, I have also found in numerous controlled baking experiments that even with the use of these comminuted shortenings there are inherent difficulties which preclude the full use or effect of all the available fat.

I have discovered that by the use of additional colloidal agents in the emulsifying of fats, either in a skimmed milk or whey medium, means are provided whereby I can now obtain practically complete useful dispersion of the shortening in dough masses and can, therefore, achieve the additional benefits resulting from the release of all the available fat contained in the comminuted shortening; such complete disengagement of fats from their adhering or enveloping films of casein solids or whey solids permits me to obtain the same effects with less shortening or, conversely, greater effects with identical quantities of shortening. As a result of numerous tests, I have found that I can use 15% to 35% less fat, depending on the nature of the formula, in identical baking procedures. This I attribute to the considerably greater ease with which my shortening can be incorporated into the dough mass and the greater rapidity with which the shortening is released from the enveloping films to perform its function.

In the processing of my new shortening I may use the same ingredients as outlined in the Chapin patent or the same ingredients as outlined in the Kraft patent, but to which I add agents of hydrophilic colloidal character preferably prior to the emulsification step. These colloids serve to function as means for accelerating the release of the milk solids from the fat and also some to greater extent than others act to lower the surface tension of the external phase of the emulsion and to promote wetting, thus to act as an emulsifying agent or emulsion stabilizer which in turn permits me to obtain a finer dispersion of the particles of fat; this finer dispersion is carried on through to the final product and there are probably greater numbers of particles in a given volume of my comminuted shortening compared with the previously known dry shortenings, although this is difficult to determine and, therefore, I do not wish to make this statement for more than a theoretical consideration. I have discovered by a series of controlled experiments that the addition of other of the colloidal organic materials which do not necessarily lower surface tension or increase the stability of the emulsion, but which, because they are hydrophilic, that is, have the characteristics of being easily wetted and readily absorptive of water, usually with swelling, quickly act to release the film or envelope of casein or whey solids which surrounds each particle of fat. I do not wish to be restricted to either one or both of these considerations because perhaps it may be a combination of rapid adsorption of water and swelling. In any event, the presence of an agent of the character described accelerates release of the milk solids from the fat whereby the fat is made quickly and completely available when the shortening powder is in contact with water.

Typical of the hydrophilic colloids which are also emulsifying or emulsion stabilizing agents are those of the nature of lecithin (of the water dispersable type) produced from any source such as soybean, eggs or milk, or equivalent edible colloidal emulsifying agents. Typical of other hydrophilic agents are those of the nature of alginates, the salts of algin, agar-agar, gum acacia, gum arabic, gum tragacanth or like materials of an albuminous or equivalent character which usually tend to swell or expand or become gelatinous in the presence of moisture. Of the emulsifying hydrophilic agents, I have found water dispersable soybean lecithin to be extremely useful; of the other hydrophilic agents I have found the ammonium salt of algin to be a very satisfactory agent, but obviously I do not wish to be limited to these materials only because any other colloidal materials which would serve to facilitate the release of and the activation of the minute fat particles should be considered as falling within the purview of a broad conception of my discovery.

In order more easily to describe one way in which my new and comminuted shortening may be produced, I cite the following example purely for illustrative purposes and not in any sense to be construed as a limitation.

*Example.*—I placed 1,000 pounds of liquid skimmed milk in an ordinary pasteurizer and heated this to at least 160° F. for sufficient time to effect pasteurization. I passed the milk through a conventional condensing apparatus and added the soybean lecithin directly to the milk in the condenser. I then added the algin previously dispersed in about 30 to 40 parts of lukewarm water; then agitation of the solution was started. After approximately 50% of the water had been removed, I passed this partially condensed solution to a hot well and added approximately 100 pounds of cottonseed oil. The entire batch was then subjected to thorough agitation to effect pre-emulsification. Keeping the solution uniformly mixed, I passed it through a homogenizing machine at a pressure in excess of 2,000 pounds which, with the aid of the added agents described above, brought about a finely divided emulsion. I then spray dried this material to obtain a practically moisture-free final powdered product. The lecithin and algin were so calculated that there was approximately 0.2% of each, based upon the weight of the final product.

It was observed that the pre-emulsion, so to speak, which was formed in the hot well, was of considerably greater stability than that which would be formed without the addition of my added emulsifying agents. Since in the process this preformed emulsion is drawn from the bottom of the hot well to the homogenizer, it is apparent that a more stable emulsion at this point renders a final emulsion which is more uniform. Without this pre-emulsion there has always been the difficulty of the fat rising to the surface (on account of its lower specific gravity) thus rendering the final product non-uniform both as to concentration of fat as well as concentration of the enveloping films. This is one reason why my final product is rendered more amenable to dissemination in dough masses and subsequent dissolution of the enveloping films. By employing the hydrophilic agents, e. g. lecithin or algin or a combination of such means, it is not necessary to employ skimmed milk of normal moisture content although this procedure may be followed. However, as illustrated by the example, it is preferred to concentrate the milk since this affords better control of the operation and places less burden on the driers. The hydrophilic agents may be added at any point in the operation, namely while the milk is in the pasteurizer, in the condenser or in the hot well.

The following comparative tests illustrate the effect of the addition of the above described agents:

I made four batches of bread each containing the same ingredients except as noted in the table below. Each batch was made under the same conditions, that is, identical baking routines were carried on under baking laboratory supervision.

| | Batch number | | | |
| --- | --- | --- | --- | --- |
| | 1 | 2 | 3 | 4 |
| | Ounces | Ounces | Ounces | Ounces |
| Flour | 50.0 | 50.0 | 50.0 | 50.0 |
| Yeast | 1.5 | 1.5 | 1.5 | 1.5 |
| Salt | 1.0 | 1.0 | 1.0 | 1.0 |
| Sugar | 1.5 | 1.5 | 1.5 | 1.5 |
| Milk | 2.5 | 1.5 | 1.5 | 1.5 |
| Lard | 2.0 | | | |
| Comminuted shortening (solids) | | 3.1 | 3.1 | 2.0 |
| Water | 32.0 | 32.0 | 34.0 | 33.0 |

(The comminuted shortening being composed of 65% fat and 35% skimmed milk.)

Batch No. 1, where the usual bread shortening was used, resulted in a full volume, normal standard loaf.

In batch No. 2, wherein the type of comminuted shortening as described in Chapin Patent No. 1,928,781 was used, the dough was slow in maturing and the finished baked loaf lacked normal volume and fully developed crumb.

In batch No. 3, using the comminuted shortening described in the previous example and in accordance with my present invention, the dough required a slight addition of water and matured at the same rate of speed as batch No. 1 and the finished baked loaf was of full volume, however, of improved crumb and texture as compared with batch No. 1.

In batch No. 4 the same amount of comminuted shortening, made in accordance with my present invention, was used as was used in the form of lard in batch No. 1. The result was a normal standard loaf of full volume even though the percentage of shortening fat was approximately 35 percent less.

These tests show that the agents selected to improve comminuted shortening had acted to liberate and activate the fat used in my example and allow the use of its full shortening functions.

Through these baking tests I also discovered that the algin agent apparently attracted more dough water to the comminuted shortening granule which action aided in the dissolution of the protective carrier. In addition, the increased amount of water required is desirable from a baking standpoint of handling and in freshness and flavor of the final product.

The baking test also showed that the algin agent expanded rapidly upon entering the initial baking heat stage. This action served to activate the tiny globules of fat sufficiently to improve their efficiency and promote uniformity in crumb structure.

The lecithin agent has utilities in baking known to those skilled in the art. It is also used in my invention as an added aid to the keeping quality of the fat substance.

I may use more or less of either lecithin or algin but generally it is desirable to keep under 2% of the shortening composition as increased amounts, particularly of the algin, cause an undesirable increase in viscosity of the emulsion; higher percentages of lecithin are not harmful but are unnecessary. Similarly as little as 0.05% or 0.1% may be used, but with somewhat less effectiveness but which. nevertheless, would serve the same purposes. This same general limitation of quantities applies to the other mentioned organic edible agents, although the upper and lower limits may not necessarily be within the same percentage figures. Anyone skilled in this art could easily determine the most advantageous percentages.

I claim as my invention:

1. A dry, comminuted, siftable, readily water dispersable shortening composed of finely divided discrete particles of an edible fat, each of the particles being provided with a coating including milk solids and an added edible, water absorptive, hydrophilic agent present in amount effective for accelerating release of milk solids from the fat in the presence of water.

2. A dry, comminuted, siftable, readily water dispersable shortening composed of finely divided discrete particles of an edible fat, each of the particles being provided with a coating including milk solids and an added edible water swellable hydrophilic agent present in amount effective to accelerate release of milk solids from the fat in the presence of water.

3. A dry, comminuted, siftable, readily water dispersable shortening composed of finely divided discrete particles of an edible fat, each of the particles being provided with a coating including milk solids and an added lecithin containing substance in amount effective to accelerate release of milk solids from the fat in the presence of water.

4. A dry, comminuted, siftable, readily water dispersable shortening composed of finely divided discrete particles of an edible fat, each of the particles being provided with a coating including milk solids and an algin containing substance in amount effective to accelerate release of milk solids from the fat in the presence of water.

5. A dry, comminuted, siftable, readily water dispersable shortening composed of finely divided discrete particles of an edible fat, each of the particles being provided with a coating including milk solids and an added lecithin containing substance and an algin containing substance in amounts effective to accelerate release of milk solids from the fat in the presence of water.

6. In the process of making a dry, comminuted, siftable, readily water dispersable shortening composition composed of finely divided discrete particles of an edible fat, each particle being provided with a coating including milk solids and an edible, water absorptive hydrophilic agent present in amount effective for accelerating release of milk solids in the presence of water, the steps which comprise including said agent in a mixture of said fat and aqueous milk solids medium emulsifying the mixture and evaporating water from the mixture.

7. In the process of making a dry, comminuted, siftable, readily water dispersable shortening composition composed of finely divided discrete particles of an edible fat, each particle being provided with a coating including milk solids and an edible, water swellable hydrophilic agent present in amount effective for accelerating release of milk solids in the presence of water, the steps which comprise including said agent in a mixture of said fat and aqueous milk solids medium, homogenizing to form an emulsion and evaporating water from the mixture.

8. In the process according to claim 7, wherein said aqueous milk solids medium comprises partially condensed skimmed milk.

9. In the process according to claim 7, wherein the agent is a lecithin-containing substance.

10. In the process according to claim 7, wherein the agent is an algin-containing substance.

11. In the process according to claim 7, wherein the agent is a mixture of an algin-containing substance and a lecithin-containing substance.

12. A product according to claim 5 in which the milk solids are skimmed milk solids.

13. A product according to claim 5 in which the milk solids are whey solids.

14. In the process according to claim 6 wherein said aqueous milk solids medium comprises partially condensed skimmed milk.

15. A dry comminuted shortening according to claim 20 wherein the agent is a hydrophilic gum.

EDWARD K. CHAPIN.